United States Patent
Gong

(10) Patent No.: US 12,250,618 B2
(45) Date of Patent: Mar. 11, 2025

(54) DATA RECEIVING METHOD FOR BLUETOOTH EARBUDS, BLUETOOTH EARBUDS, AND STORAGE MEDIUM

(71) Applicant: GUANGDONG OPPO MOBILE TELECOMMUNICATIONS CORP., LTD., Dongguan (CN)

(72) Inventor: Jinhua Gong, Dongguan (CN)

(73) Assignee: GUANGDONG OPPO MOBILE TELECOMMUNICATIONS, Dongguan (CN)

( * ) Notice: Subject to any disclaimer, the term of this patent is extended or adjusted under 35 U.S.C. 154(b) by 289 days.

(21) Appl. No.: 17/841,303

(22) Filed: Jun. 15, 2022

(65) Prior Publication Data

US 2022/0312167 A1 Sep. 29, 2022

Related U.S. Application Data

(63) Continuation of application No. PCT/CN2020/136968, filed on Dec. 16, 2020.

(30) Foreign Application Priority Data

Dec. 16, 2019 (CN) .......................... 201911295940.7

(51) Int. Cl.
*H04W 4/80* (2018.01)
*H04W 76/14* (2018.01)
*H04W 84/20* (2009.01)

(52) U.S. Cl.
CPC ............. *H04W 4/80* (2018.02); *H04W 76/14* (2018.02); *H04W 84/20* (2013.01)

(58) Field of Classification Search
CPC ....... H04W 4/80; H04W 76/14; H04W 84/20; H04W 76/15; H04L 2001/0097; H04L 1/1848; H04L 1/1864; H04L 1/188

(Continued)

(56) References Cited

U.S. PATENT DOCUMENTS 10,412,481 B1 9/2019 Wu et al.
2019/0141502 A1 5/2019 Sung et al.
(Continued)

FOREIGN PATENT DOCUMENTS

CN 108429949 A 8/2018
CN 109561419 A 4/2019
(Continued)

OTHER PUBLICATIONS

Reexamination Notice from corresponding Chinese Application No. 201911295940.7, dated Feb. 8, 2023. English translation attached.

(Continued)

*Primary Examiner* — Eugene Yun
(74) *Attorney, Agent, or Firm* — Sheppard, Mullin, Richter & Hampton LLP

(57) ABSTRACT

Provided are a data receiving method and apparatus for Bluetooth earbuds, Bluetooth earbuds, and a non-transitory storage medium. The method includes: transmitting, by a master earbud of the Bluetooth earbuds, connection parameter information of a first wireless link between the master earbud and an audio source device to a slave earbud of the Bluetooth earbuds; receiving, by the master earbud through the first wireless link, first audio data transmitted from the audio source device; obtaining the first audio data by monitoring the first wireless link, by the slave earbud based on the connection parameter information; and transmitting an acknowledgement message to the audio source device by the master earbud, in response to not receiving a feedback from the slave earbud in a predetermined time period after receiving the first audio data, to notify the audio source device to transmit second audio data.

20 Claims, 6 Drawing Sheets

(58) Field of Classification Search
USPC .......................................................... 455/41.2
See application file for complete search history.

(56) References Cited

U.S. PATENT DOCUMENTS

| | | | |
|---|---|---|---|
| 2019/0387319 A1 | 12/2019 | Tong et al. | |
| 2021/0092578 A1* | 3/2021 | Ryu | ........................ G06F 3/165 |
| 2022/0369394 A1* | 11/2022 | Ni | ........................... H04W 4/80 |
| 2023/0030553 A1* | 2/2023 | Haartsen | ............... H04W 76/19 |

FOREIGN PATENT DOCUMENTS

| | | | |
|---|---|---|---|
| CN | 109660971 A | 4/2019 |
| CN | 109768806 A | 5/2019 |
| CN | 110234100 A | 9/2019 |
| CN | 110234101 A | 9/2019 |
| CN | 110519742 A | 11/2019 |
| WO | 2019129748 A1 | 7/2019 |

OTHER PUBLICATIONS

Extended European Search Report dated Dec. 16, 2022 received in European Patent Application No. EP20903610.2.
Reexamination Decision from corresponding Chinese Application No. 201911295940.7, dated May 5, 2023. English translation attached.
International Search Report and Written Opinion dated Mar. 16, 2021 in International Application No. PCT/CN2020/136968. English translation attached.
First Office Action from corresponding Chinese Application No. 201911295940.7, dated Oct. 29, 2021. English translation attached.
The Second Office Action from corresponding Chinese Application No. 201911295940.7, dated Feb. 28, 2022. English translation attached.
Rejection Decision from corresponding Chinese Application No. 201911295940.7, dated May 25, 2022. English translation attached.

* cited by examiner

DATA RECEIVING METHOD FOR BLUETOOTH EARBUDS, BLUETOOTH EARBUDS, AND STORAGE MEDIUM

CROSS-REFERENCE TO RELATED APPLICATIONS

The present application is a continuation of International Patent Application No. PCT/CN2020/136968, filed on Dec. 16, 2020, which claims priority to and the benefit of Chinese Patent Application No. 201911295940.7, filed on Dec. 16, 2019, the entire disclosures of which are incorporated herein by their references

TECHNICAL FIELD

The present disclosure relates to the field of wireless communication technologies, and more particularly, to a data receiving method and apparatus for Bluetooth earbuds, a device, and a storage medium.

BACKGROUND

True Wireless Stereo (TWS) earbuds include two separate earbuds for a user's left and right ears, respectively. The two earbuds do not need to be connected to each other through a cable, realizing wireless separation of left and right channels.

SUMMARY

In an aspect of the present disclosure, a data receiving method for Bluetooth earbuds is provided. The method includes: transmitting, by a master earbud of the Bluetooth earbuds, connection parameter information of a first wireless link between the master earbud and an audio source device to a slave earbud of the Bluetooth earbuds; receiving, by the master earbud through the first wireless link, first audio data from the audio source device; obtaining the first audio data by monitoring the first wireless link, by the slave earbud based on the connection parameter information; and transmitting an acknowledgement message to the audio source device by the master earbud, in response to not receiving a feedback from the slave earbud in a predetermined time period after receiving the first audio data, so as to notify the audio source device to transmit second audio data.

In another aspect of the present disclosure, Bluetooth earbuds are provided. The Bluetooth earbuds include one or more processors; and memory having instructions stored thereon, the instructions being executable by the processor. The processor is configured to execute the instructions to invoke the Bluetooth earbuds to implement the aforementioned method.

In yet another aspect of the present disclosure, a non-transitory computer-readable storage medium is provided. The medium has a computer program stored thereon. The computer program, when executed by a processor, implements the aforementioned method.

BRIEF DESCRIPTION OF DRAWINGS

The accompanying drawings here are incorporated into and form a part of the specification, which illustrate embodiments consistent with the present disclosure, and are used together with the description to explain principles of the present disclosure. Apparently, the drawings described below are merely some embodiments of the present disclosure. Based on these drawings, those skilled in the art can obtain other drawings without creative effort.

DESCRIPTION OF EMBODIMENTS

Figure 1:
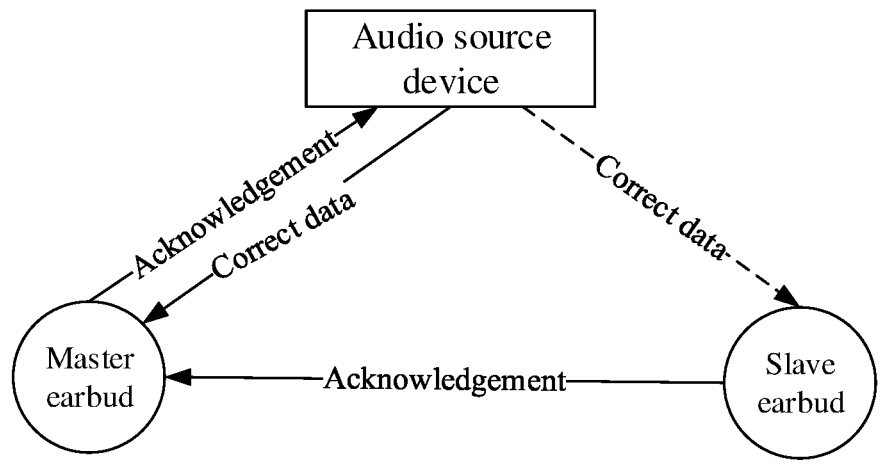
FIG. 1 illustrates a schematic diagram of a data receiving method between a master earbud and a slave earbud of TWS Bluetooth earbuds in the related art.

Exemplary embodiments will be described below more comprehensively with reference to the accompanying drawings. However, the exemplary embodiments can be implemented in a variety of forms and should not be construed as being limited to the examples set forth herein. Rather, these embodiments provided make the present disclosure more comprehensive and complete, and convey concepts of the exemplary embodiments to those skilled in the art in a thorough manner. The features, structures, or characteristics described here may be combined in one or more embodiments in any suitable manner.

In addition, the accompanying drawings are only schematic illustrations of the present disclosure and are not necessarily drawn to scale. Identical reference numerals in the figures indicate identical or similar parts, and thus repetitive descriptions thereof will be omitted. Some of the block diagrams illustrated in the accompanying drawings are functional entities and do not necessarily have to correspond to physical or logical separate entities. These functional entities may be implemented in a software form, or in one or more hardware modules or an integrated circuit, or in different networks and/or processor devices and/or micro-controller devices.

Furthermore, in the description of the present disclosure, terms "first" and "second" are used for descriptive purposes only and are not intended to indicate or imply relative importance or implicitly specify the number of technical features indicated. Therefore, a feature defined with "first" and "second" may explicitly or implicitly include one or more this feature.

FIG. 1 illustrates a schematic diagram of a data receiving method between a master earbud and a slave earbud of TWS Bluetooth earbuds in the related art.

As illustrated in FIG. 1, the slave earbud monitors a wireless connection between the master earbud and an audio source device, and transmits an ACK (Acknowledgement) to the master earbud in response to correctly receiving audio data transmitted from an audio source device. When the master earbud receives the ACK transmitted from the slave earbud and the master earbud also receives the audio data correctly, the master earbud transmits an ACK to the audio source device to notify the audio source device to transmit a next packet of audio data.

However, when there is interference to signals transmitted between the master earbud and the slave earbud (e.g., resulted from sheltering by head), the master earbud may never receive the ACK transmitted from the slave earbud, and may therefore constantly transmit a retransmission request to the audio source device. When such an operation keeps occurring cyclically, lagging or playing stoppage of the master earbud and the slave earbud will be eventually be caused due to insufficient audio source data to be played.

In view of this, embodiments of the present disclosure provide a data receiving method and apparatus for Bluetooth earbuds, a device, and a storage medium.

Figure 2:
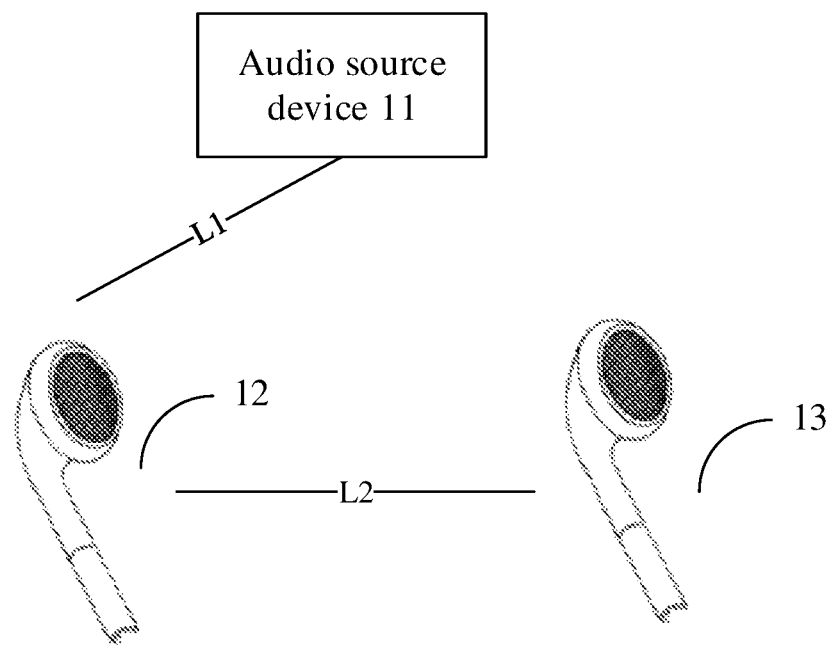
FIG. 2 is a schematic diagram showing an audio playing system according to an exemplary embodiment.

FIG. 2 is a schematic diagram showing an audio playing system according to an example embodiment. As illustrated in FIG. 2, an audio playing system 1 includes an audio source device 11, a master earbud 12 of TWS Bluetooth earbuds, and a slave earbud 13 of the TWS Bluetooth earbuds.

The audio source device 11 can be a smart device having a Bluetooth communication function, such as a smartphone, a tablet personal computer, etc.

Communication between the audio source device 11 and the master earbud 12 is carried out through an established first wireless link L1.

Communication between the master earbud 12 and the slave earbud 13 is carried out through an established second wireless link L2.

Both the first wireless link L1 and the second wireless link L2 are wireless connections established based on the Bluetooth communication protocol.

Blocks of each data receiving method for the Bluetooth earbuds according to the embodiments of the present disclosure will be described in detail below in conjunction with the accompanying drawings and embodiments.

Figure 3:
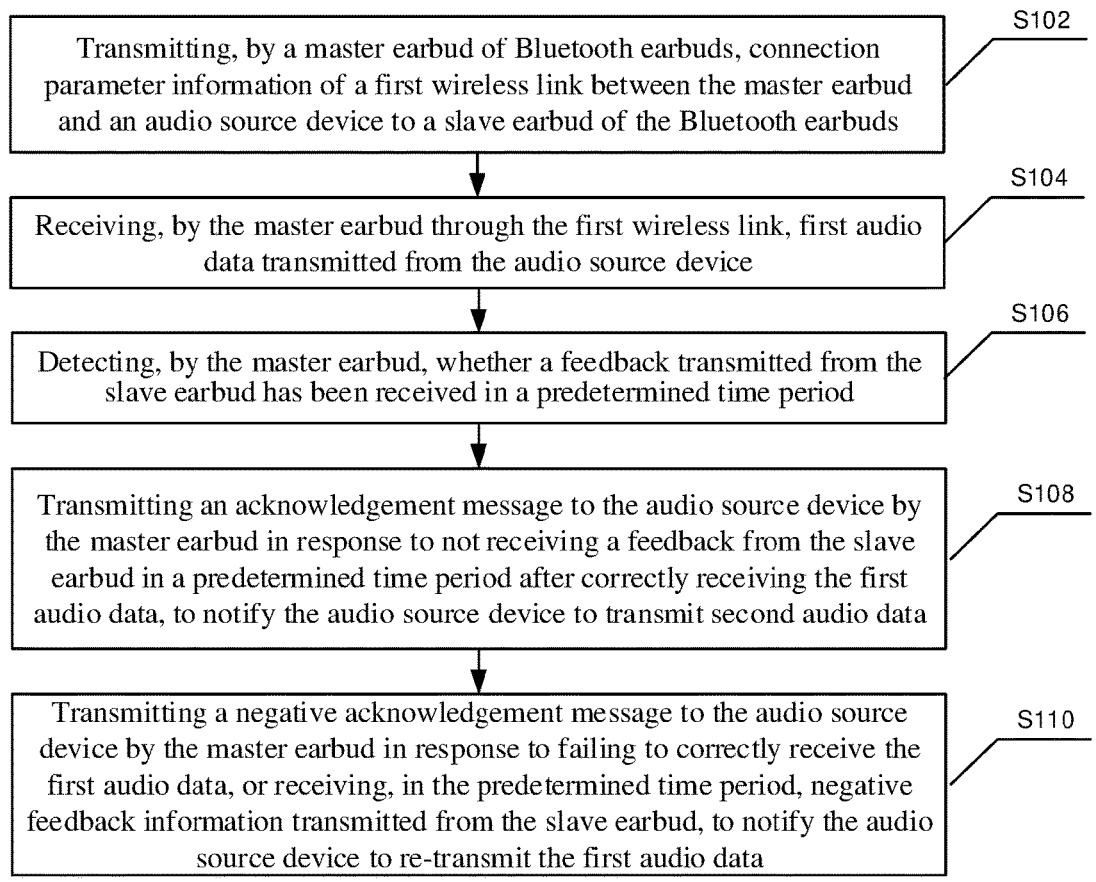
FIG. 3 illustrates a flowchart of a data receiving method for Bluetooth earbuds according to embodiments of the present disclosure.

FIG. 3 illustrates a flowchart of a data receiving method for Bluetooth earbuds according to embodiments of the present disclosure. The method provided by the embodiments of the present disclosure can be implemented by the master earbud of the TWS Bluetooth earbuds.

Referring to FIG. 3, a data receiving method 10 for Bluetooth earbuds includes the following blocks.

At block S102, a master earbud of the Bluetooth earbuds transmits connection parameter information of a first wireless link between the master earbud and an audio source device to a slave earbud of the Bluetooth earbuds.

With reference to FIG. 2, the first wireless link L1 is established between the master earbud 12 and the audio source device 11. To enable the slave earbud 13 to receive, by monitoring the first wireless link L1, the audio data transmitted from the audio source device 11, it is necessary for the master earbud 12 to transmit the connection parameter information of the first wireless link L1 to the slave earbud 13. The connection parameter information may include, for example, connection information of the first wireless link (e.g., a Bluetooth communication address of the audio source device 11, etc.), frequency-hopping information (e.g., a frequency-hopping sequence, an Adaptive Frequency Hopping (AFH) channel map table, etc.), and encryption information (e.g., a secrete key, etc.). Based on these information, the slave earbud 13 can actively monitor the first wireless link to obtain the data transmitted on the first wireless link.

For example, the master earbud 12 may transmit the connection parameter information of the first wireless link L1 to the slave earbud 13 through the second wireless link L2 between the master earbud 12 and the slave earbud 13.

At block S104, the master earbud receives, through the first wireless link, first audio data transmitted from the audio source device.

The master earbud 12 receives, through the first wireless link, the first audio data transmitted from the audio source device.

The slave earbud 13 monitors the first wireless link to obtain the first audio data transmitted from the audio source device on the first wireless link.

At block S106, the master earbud detects whether feedback transmitted from the slave earbud has been received in a predetermined time period.

The master earbud 12 detects whether any feedback transmitted from the slave earbud 13 has been received. The feedback may include, for example, negative feedback information indicating that the slave earbud fails to correctly receive the first audio data.

For example, the master earbud 12 may monitor the second wireless link L2 in a communication gap with the audio source device 11 to detect whether the negative feedback information transmitted from the slave earbud 13 has been received.

In some embodiments of the present disclosure, the slave earbud 13 transmits the negative feedback information to the master earbud 12 only when the slave earbud 13 fails to correctly receive the first audio data, to indicate the failure of correctly receiving the first audio data, instead of the slave earbud 13 transmitting positive feedback information (such as the ACK described above) to the master earbud 12 after receiving a packet of audio data each time. That is, the slave earbud 13 does not transmit any feedback to the master earbud 12 after correctly receiving the audio data each time.

In Bluetooth communication, two communication parties set their respective transmitting time slots and receiving time slots, with a transmitting time slot of one party being a receiving time slot of the other party, thereby ensuring that the two parties can communicate with each other correctly. In some embodiments, the master earbud 12 detects presence of data transmitted from the slave earbud on the second wireless link L2, in a receiving time slot of the master earbud 12 in the second wireless link L2, to detect whether a feedback transmitted from the slave earbud has been received.

At block S108, in response to not receiving a feedback from the slave earbud in a predetermined time period after correctly receiving the first audio data, the master earbud 12 transmits an acknowledgement message (i.e., the ACK) to the audio source device, to notify the audio source device to transmit second audio data.

Here, the master earbud 12 transmits the ACK to the audio source device 11 only after it has not received any feedback from the slave earbud in the predetermined time period after correctly receiving the first audio data, to notify the audio source device to transmit the second audio data (a next packet of audio data).

Further, not receiving any feedback from the slave earbud in the predetermined time period includes not receiving the negative feedback information from the slave earbud in the predetermined time period.

That is, a failure of receiving the negative feedback information from the slave earbud in the predetermined time period may be resulted from a case that the slave earbud receives an audio signal correctly and thus does not transmit a feedback, or a case that a poor communication quality of the second wireless link between the master earbud and the slave earbud results in an inability to receive the negative feedback information. The predetermined time period is set, for example, to be shorter than or equal to a time length of the receiving time slot of the master earbud 12 in the second wireless link L2 as described above. That is, when no feedback information is received from the slave earbud 13 within the receiving time slot, the slave earbud 13 is considered to have correctly received the first audio data.

In some embodiments, the data receiving method 10 for the Bluetooth earbuds may further include the following blocks.

At block S110, in response to failing to correctly receive the first audio data or receiving, in the predetermined time period, the negative feedback information transmitted from the slave earbud, the master earbud transmits a negative acknowledgement message (i.e., a negative acknowledgement or an NACK) to the audio source device, to notify the audio source device to re-transmit the first audio data.

If the master earbud 12 fails to correctly receive the first audio data, or the master earbud 12 has received, in the predetermined time period, the negative feedback information transmitted from the slave earbud 13, the master earbud 12 transmits the negative acknowledgement message to the audio source device 11, to notify the audio source device 11 to re-transmit the first audio data.

That is, when the master earbud 12 fails to correctly receive the first audio data, or when the master earbud receives, in the predetermined time period, the negative feedback information transmitted from the slave earbud, the master earbud transmits the negative acknowledgement message to the audio source device, to notify the audio source device to re-transmit the first audio data.

According to the data receiving method for the Bluetooth earbuds provided by some embodiments of the present disclosure, the master earbud attempts to receive the negative feedback information transmitted from the slave earbud, and determines, in response to not receiving the negative feedback information in the predetermined time period, that the slave earbud has correctly received the audio data transmitted from the audio source device. By this method, in a case where a wireless communication environment between the master earbud and the slave earbud is poor (e.g., when serious interference occurs), when the master earbud fails to receive, in the predetermined time period, feedback information transmitted from the slave earbud due to interference, the master earbud still determines that the slave earbud has correctly received the audio data, and therefore continues to request the audio source device to transmit a next packet of audio data. In this manner, it is ensured that at least one of the master earbud or the slave earbud can normally receive the audio data, thereby avoiding a problem in the related art of playing lagging or stoppage caused by the audio source device excessively retransmitting a same packet of audio data.

In addition, the slave earbud transmits the negative feedback information to the master earbud only when failing to correctly receive the audio data transmitted from the audio source device. With this method, data transmissions between the master earbud and the slave earbud can be reduced when the master earbud and the slave earbud have a good wireless communication environment (e.g., an environment with a high signal strength and less interference) therebetween, thereby lowering a power loss of the slave earbud.

In addition, in some embodiments, after monitoring the first audio data in the first wireless link, the slave earbud transmits the positive feedback information, e.g., the ACK, to the master earbud in response to correctly obtaining the first audio data, and transmits the negative feedback information, e.g., the NACK, to the master earbud in response to failing to correctly obtain the first audio data. The master earbud transmits, in response to correctly receiving the first audio data and receiving the ACK transmitted from the slave earbud, an acknowledgement to the audio source device to allow the audio source device to transmit the second audio data. The master earbud transmits, in response to failing to correctly receive the first audio data or receiving the NACK transmitted from the slave earbud, a negative acknowledgement to the audio source device to allow the audio source device to re-transmit the first audio data. The master earbud transmits, in response to correctly receiving the first audio data and failing to receive, in the predetermined time period, any feedback from the slave earbud (including failing to receive the ACK or the NACK), an acknowledgement to the audio source device to allow the audio source device to transmit the second audio data. Therefore, it is ensured that receiving and playing of the master earbud can still be conducted when a communication quality of the second wireless link is poor due to head sheltering, etc.

In some embodiments, after monitoring the first audio data in the first wireless link, the slave earbud transmits the positive feedback information, e.g., the ACK, to the master earbud in response to correctly obtaining the first audio data, and does not transmit, any feedback information to the master earbud in response to failing to correctly obtain the first audio data. The master earbud transmits, in response to correctly receiving the first audio data and receiving the ACK transmitted from the slave earbud, an acknowledgement to the audio source device to allow the audio source device to transmit the second audio data. In response to correctly receiving the first audio data and not receiving, in the predetermined time period, any feedback information transmitted from the slave earbud (including a case where the slave earbud has transmitted the ACK but the master earbud fails to receive the ACK due to a poor communication quality of the second wireless link, and a case where the slave earbud has not transmitted any feedback information), the master earbud transmits an acknowledgement to the audio source device. Such an implementation also guarantees the receiving and playing of the master earbud.

Figure 4:
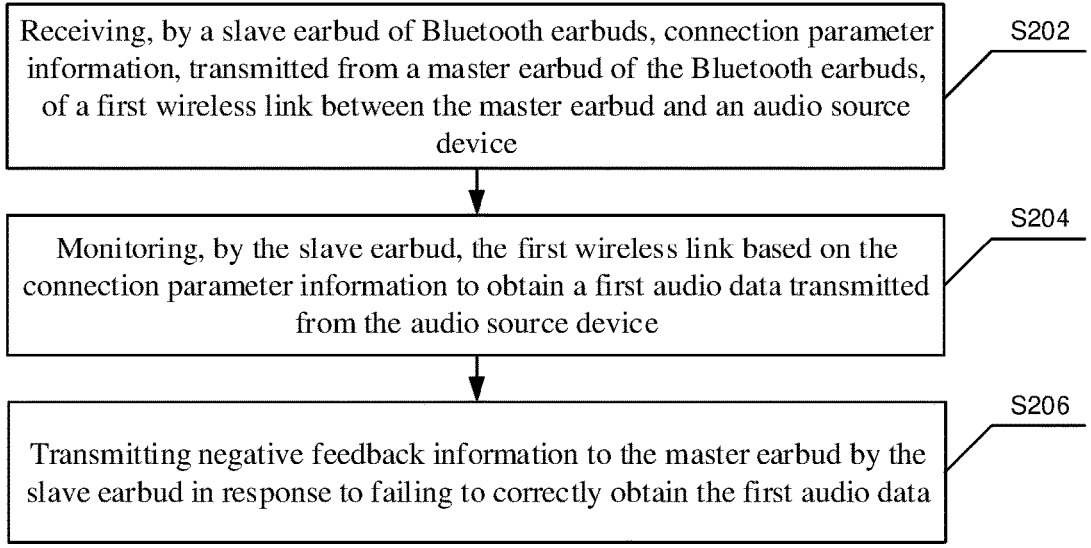
FIG. 4 illustrates a flowchart of another data receiving method for Bluetooth earbuds according to embodiments of the present disclosure.

FIG. 4 illustrates a flowchart of another data receiving method for Bluetooth earbuds according to embodiments of the present disclosure. The method provided by the embodiments of the present disclosure can be implemented by the slave earbud in the TWS Bluetooth earbuds.

Referring to FIG. 2 and FIG. 4 together, a data receiving method 20 for Bluetooth earbuds includes the following blocks.

At block S202, a slave earbud of the Bluetooth earbuds receives connection parameter information, transmitted from the master earbud of the Bluetooth earbuds, of a first wireless link between the master earbud and the audio source device.

As described above, the slave earbud 13 receives the connection parameter information of the first wireless link L1 transmitted from the master earbud 12. The connection parameter information may include, for example, connection information of the first wireless link (e.g., a Bluetooth communication address of the audio source device 11, etc.), frequency-hopping information (e.g., a frequency-hopping sequence, an AFH channel map table, etc.), and encryption information (e.g., a secrete key, etc.), etc.

The slave earbud 13 receives the connection parameter information through, for example, the second wireless link L2 described above.

At block S204, the slave earbud monitors the first wireless link based on the connection parameter information to obtain first audio data transmitted from the audio source device.

Based on the connection parameter information as described above, the slave earbud 13 may monitor the first wireless link L1 to detect the presence of the first audio data transmitted from the audio source device 11 on the first wireless link L1.

At block S206, the slave earbud transmits negative feedback information to the master earbud in response to failing to correctly obtain the first audio data.

The negative feedback information indicates that the slave earbud fails to correctly obtain the first audio data.

After receiving the first audio data, the slave earbud 13 determines whether the first audio data has been correctly obtained. For example, the slave earbud 13 determines whether the obtained first audio data is correct by means of verification.

When the first audio data is correctly obtained, the slave earbud 13 does not transmit a positive confirmation (i.e., does not transmit any feedback) to the master earbud 12. Rather, the slave earbud 13 transmits the negative feedback information to the master earbud 12 only when the first audio data has not been correctly obtained, to indicate that the slave earbud 13 fails to correctly receive the first audio data.

For example, the slave earbud 13 may transmit feedback through the second wireless link L2 described above.

According to the data receiving method for the Bluetooth earbuds provided by the embodiments of the present disclosure, the slave earbud transmits the negative feedback information to the master earbud only when failing to receive the audio data transmitted from the audio source device. By this method, in a case where the wireless communication environment between the master earbud and the slave earbud is poor (e.g., when serious interference occurs), when the master earbud fails to receive, within a predetermined time period, feedback information transmitted from the slave earbud due to interference, the master earbud still determines that the slave earbud has correctly received the audio data, and therefore continues to request the audio source device to transmit a next packet of audio data. In this manner, it is ensured that at least one of the master earbud or the slave earbud can normally receive the audio data, thereby avoiding the problem in the related art of playing lagging or stoppage caused by the audio source device constantly retransmitting a same packet of audio data.

In addition, with this method, data transmissions between the master earbud and the slave earbud can be reduced when the master earbud and the slave earbud have a good wireless communication environment (e.g., an environment with a high signal strength and less interference) therebetween, thereby lowering a power loss of the slave earbud.

Figure 5:
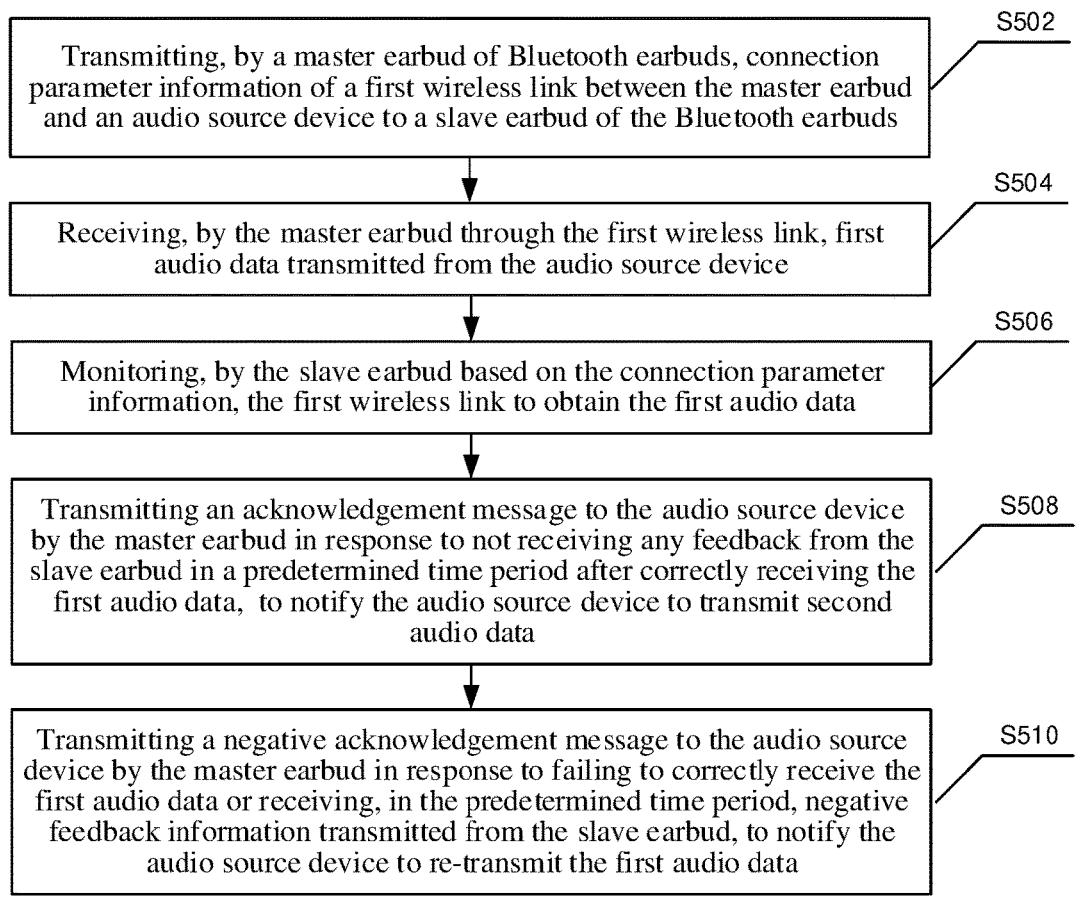
FIG. 5 illustrates a flowchart of yet another data receiving method for Bluetooth earbuds according to embodiments of the present disclosure.

FIG. 5 illustrates a flowchart of yet another data receiving method for Bluetooth earbuds according to embodiments of the present disclosure.

Referring to FIG. 2 and FIG. 5 together, a data receiving method 50 for Bluetooth earbuds includes the following blocks.

At block S502, a master earbud of the Bluetooth earbuds transmits connection parameter information of a first wireless link between the master earbud and an audio source device to a slave earbud of the Bluetooth earbuds.

At block S504, the master earbud receives, through the first wireless link, first audio data transmitted from the audio source device.

At block S506, the slave earbud monitors the first wireless link based on the connection parameter information to obtain the first audio data.

At block S508, the master earbud transmits an acknowledgement message to the audio source device, in response to not receiving any feedback from the slave earbud in a predetermined time period after correctly receiving the first audio data, to notify the audio source device to transmit second audio data.

In some embodiments, the any feedback may include, for example, negative feedback information indicating that the slave earbud fails to correctly receive the first audio data. For example, the method 50 may further include, prior to block S508: transmitting negative feedback information to the master earbud by the slave earbud, in response to the slave earbud failing to correctly obtain the first audio data; and not transmitting the positive feedback information to the master earbud by the slave earbud, in response to the slave earbud correctly obtaining the first audio data, the positive feedback information indicating that the slave earbud has correctly received the first audio data.

In some embodiments, the method 50 may further include block S510. At block S510, the master earbud transmits a negative acknowledgement message to the audio source device, in response to failing to correctly receive the first audio data or receiving, in the predetermined time period, the negative feedback information transmitted from the slave earbud, to notify the audio source device to re-transmit the first audio data.

According to the data receiving method for the Bluetooth earbuds provided by the embodiments of the present disclosure, in response to failing to receive, in the predetermined time period, any feedback (including the negative feedback information) from the slave earbud, the master earbud determines that the slave earbud has correctly received the audio data transmitted from the audio source device. By this method, in a case where the wireless communication environment between the master earbud and the slave earbud is poor (e.g., when serious interference occurs), when the master earbud fails to receive, in the predetermined time period, feedback information transmitted from the slave earbud due to interference, the master earbud still determines that the slave earbud has correctly received the audio data, and therefore continues to request the audio source device to transmit a next packet of audio data. In this manner, it is ensured that at least one of the master earbud or the slave earbud can normally receive the audio data, thereby avoiding the problem in the related art of playing lagging or stoppage caused by the audio source device constantly retransmitting a same packet of audio data.

Furthermore, the slave earbud transmits the negative feedback information to the master earbud only when failing to correctly receive the audio data transmitted from the audio source device. With this method, data transmissions between the master earbud and the slave earbud can be reduced when the master earbud and the slave earbud have a good wireless communication environment (e.g., an environment with a high signal strength and less interference) therebetween, thereby lowering a power loss of the slave earbud.

Figure 6:
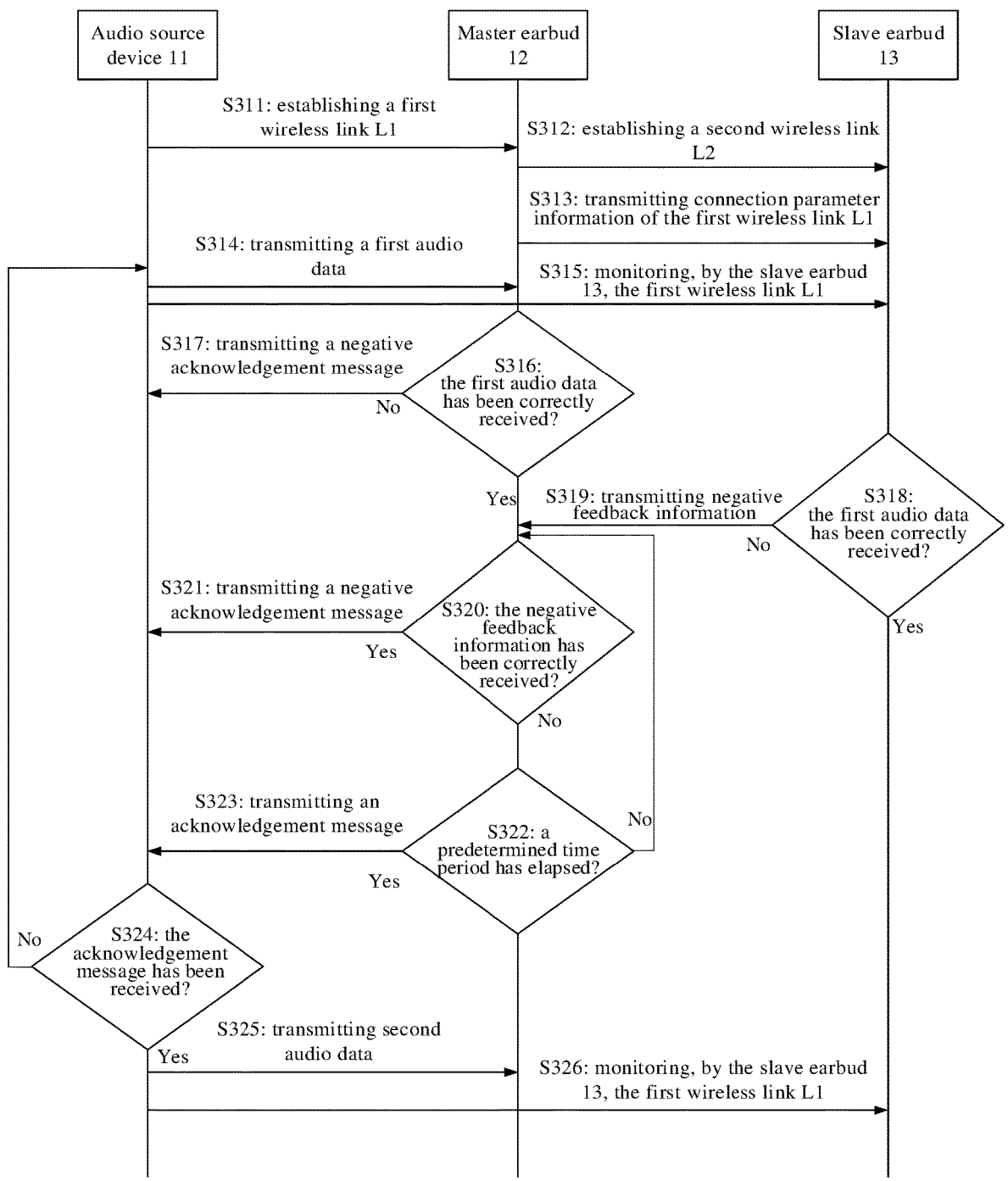
FIG. 6 illustrates a flowchart of still yet another data receiving method for Bluetooth earbuds according to embodiments of the present disclosure.

FIG. 6 illustrates a flowchart of still yet another data receiving method for Bluetooth earbuds according to embodiments of the present disclosure.

Referring to FIG. 2 and FIG. 6 together, a data receiving method 30 for Bluetooth earbuds includes the following blocks.

At block S311, a first wireless link L1 is established between an audio source device 11 and a master earbud 12 of the Bluetooth earbuds.

At block S312, a second wireless link L2 is established between the master earbud 12 and a slave earbud 13 of the Bluetooth earbuds.

At block S313, the master earbud 12 transmits connection parameter information of the first wireless link L1 to the slave earbud 13.

At block S314, the audio source device 11 transmits first audio data to the master earbud 12.

At block S315, the slave earbud 13 monitors the first wireless link L1 to detect whether the first audio data has been received.

At block S316, the master earbud 12 determines whether the master earbud 12 itself has correctly received the first audio data. If yes, the method proceeds to block S320; otherwise, the method proceeds to block S317.

At block S317, the master earbud 12 transmits a negative acknowledgement message NACK to the audio source device 11, to notify the audio source device 11 to re-transmit the first audio data.

At block S318, the slave earbud 13 determines whether the slave earbud 13 itself has correctly received the first audio data. If yes, the method proceeds to block S326; otherwise, the method proceeds to block S319.

At block S319, the slave earbud 13 transmits to the master earbud 12 negative feedback information indicating that the slave earbud 13 fails to correctly receive the first audio data.

At block S320, the master earbud 12 determines whether the negative feedback information transmitted from the slave earbud 13 has been received. If yes, the method proceeds to block S321; otherwise, the method proceeds to block S322.

At block S321, the master earbud 12 transmits a negative acknowledgement message NACK to the audio source device 11 to notify the audio source device 11 to re-transmit the first audio data.

At block S322, the master earbud 12 determines whether a predetermined time period has elapsed. If yes, the method proceeds to block S323; otherwise, the method returns to block S320.

At block S323, the master earbud 12 transmits an acknowledgement message to the audio source device 11 to notify the audio source device 11 to transmit second audio data.

At block S324, the audio source device 11 determines whether the acknowledgement message has been received. If yes, the method proceeds to block S325; otherwise, the method returns to the block S314 to re-transmit the first audio data.

At block S325, the audio source device 11 transmits the second audio data based on the first wireless link L1.

At block S326, the slave earbud 13 monitors the first wireless link L1 to detect whether the second audio data has been received.

It is to be noted that the figures as described above are only schematic illustrations of processings included in the methods according to exemplary embodiments of the present disclosure, and are not intended for a limiting purpose. It is readily understood that the processings illustrated in the figures as described above do not indicate or limit a chronological order of these processings. It is also readily understood that these processings may be performed, for example, in different modules, either synchronously or asynchronously.

With the data receiving method for the Bluetooth earbuds provided by the embodiments of the present disclosure, the master earbud can transmit, in response to not receiving a feedback transmitted from the slave earbud, the acknowledgement message to the audio source device. By this method, in a case where a wireless communication environment between the master earbud and the slave earbud is poor (e.g., when serious interference occurs), when the master earbud fails to receive, in the predetermined time period, any feedback transmitted from the slave earbud due to interference, the master earbud can still think that the slave earbud has correctly received audio data, and can therefore continue to request the audio source device to transmit a next packet of audio data. In this manner, it is ensured that at least one of the master earbud or the slave earbud can normally receive the audio data, thereby avoiding a problem in the related art of playing lagging or stoppage caused by the audio source device excessively retransmitting a same packet of audio data.

Further, with the data receiving method for the Bluetooth earbuds provided by the embodiments of the present disclosure, the slave earbud transmits the negative feedback information only when the first audio data is not correctly received, such that a volume of data transmitted between the master earbud and the slave earbud can be reduced when the master earbud and the slave earbud are in a good wireless communication environment (e.g., an environment with a high signal strength and less interference), thereby lowering a power loss of the slave earbud.

Apparatus embodiments of the present disclosure are described below and can be used to perform method embodiments of the present disclosure. For details not disclosed in the apparatus embodiments of the present disclosure, reference may be made to the method embodiments of the present disclosure.

Figure 7:
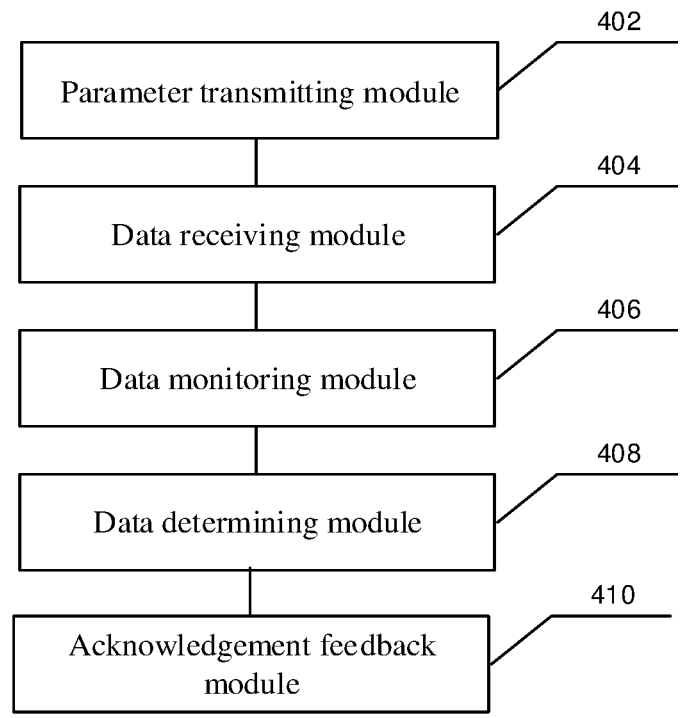
FIG. 7 illustrates a block diagram of a data receiving apparatus for Bluetooth earbuds according to embodiments of the present disclosure.

FIG. 7 illustrates a block diagram of a data transceiver apparatus for Bluetooth earbuds according to embodiments of the present disclosure. The apparatus can be applied in the master earbud in the TWS Bluetooth earbuds.

Referring to FIG. 7, a data transceiver apparatus 40 for Bluetooth earbuds includes a parameter transmitting module 402, a data receiving module 404, a data monitoring module 406, and an acknowledgement feedback module 408.

The parameter transmitting module 402 is configured to transmit, by a master earbud of the Bluetooth earbuds, connection parameter information of a first wireless link between the master earbud and an audio source device to a slave earbud of the Bluetooth earbuds.

The data receiving module 404 is configured to receive, by the master earbud through the first wireless link, first audio data transmitted from the audio source device.

The link monitoring module 406 is configured to monitor, by the slave earbud based on the connection parameter information, the first wireless link to obtain the first audio data.

The acknowledgement feedback module 408 is configured to transmit, by the master earbud in response to correctly receiving the first audio data and failing to receive, within a predetermined time period, any feedback from the slave earbud, an acknowledgement message to the audio source device, to notify the audio source device to transmit second audio data.

In some embodiments, the any feedback includes negative feedback information indicating that the slave earbud fails to correctly receive the first audio data. Furthermore, the data transceiver apparatus 40 for the Bluetooth earbuds further includes a data determining module 408. The data determining module 408 is configured to not transmit positive feedback information to the master earbud by the slave earbud, in response to the slave earbud correctly obtaining the first audio data, the positive feedback information indicating that the slave earbud has correctly received the first audio data; and transmit the negative feedback information to the master earbud by the slave earbud in response to failing to correctly obtain the first audio data.

In some embodiments, the data determining module 408 is further configured to not transmit any feedback information to the master earbud by the slave earbud in response to the salve earbud failing to correctly obtain the first audio data.

In some embodiments, the any feedback includes positive feedback information indicating that the slave earbud has correctly received the first audio data. The data determining module 408 is further configured to transmit, by the slave earbud in response to correctly obtaining the first audio data, the positive feedback information to the master earbud.

In some embodiments, the acknowledgement feedback module 410 is further configured to transmit, by the master earbud in response to failing to correctly receive the first audio data or receiving, in the predetermined time period, the negative feedback information, a negative acknowledgement message to the audio source device, to notify the audio source device to re-transmit the first audio data.

In some embodiments, the acknowledgement feedback module 410 is further configured to transmit, by the master earbud in response to receiving, in the predetermined time period, the negative feedback information, a negative acknowledgement message to the audio source device, to notify the audio source device to re-transmit the first audio data.

In some embodiments, the acknowledgement feedback module 410 is configured to transmit, by the master earbud in response to correctly receiving the first audio data and receiving the positive feedback information transmitted from the slave earbud, an acknowledgement message to the audio source device, to notify the audio source device to transmit second audio data.

In some embodiments, the data receiving apparatus 40 for the Bluetooth earbuds includes a first connection-establishing module and a second connection-establishing module. The first connection-establishing module is configured to establish a first connection between the master earbud and the audio source device to form the first wireless link. The second connection-establishing module is configured to establish a second connection between the master earbud and the slave earbud to form a second wireless link. The parameter transmitting module 402 is configured to transmit, by the master earbud through the second wireless link, the connection parameter information of the first wireless link to the slave earbud.

In some embodiments, the data receiving apparatus 40 for the Bluetooth earbuds further includes a feedback receiving module. The feedback receiving module is configured to detect, by the master earbud, whether feedback transmitted from the slave earbud has been received through the second wireless link.

In some embodiments, the predetermined time period is shorter than or equal to a time length of a receiving time slot of the second wireless link.

According to the data receiving apparatus for the Bluetooth earbuds provided by the embodiments of the present disclosure, the master earbud attempts to receive any feedback (including the negative feedback information) transmitted from the slave earbud, and determines, in response to failing to receive the any feedback in the predetermined time period, that the slave earbud has correctly received the audio data transmitted from the audio source device. By this method, in a case where a wireless communication environment between the master earbud and the slave earbud is poor (e.g., when serious interference occurs), when the master earbud fails to receive, in the predetermined time period, feedback information transmitted from the slave earbud due to interference, the master earbud still determines that the slave earbud has correctly received the audio data, and therefore continues to request the audio source device to transmit a next packet of audio data. In this manner, it is ensured that at least one of the master earbud or the slave earbud can normally receive the audio data, thereby avoiding a problem in the related art of playing lagging or stoppage caused by the audio source device constantly retransmitting a same packet of audio data.

In addition, the slave earbud transmits the negative feedback information to the master earbud only when failing to correctly receive the audio data transmitted from the audio source device. With this method, data transmissions between the master earbud and the slave earbud can be reduced when the master earbud and the slave earbud have a good wireless communication environment (e.g., an environment with a high signal strength and less interference) therebetween, thereby lowering a power loss of the slave earbud.

Those skilled in the art can understand that the various aspects of the present disclosure can be implemented as systems, methods, or program products. Accordingly, the various aspects of the present disclosure may be specifically implemented in a form of complete hardware, complete software (including firmware, microcodes, etc.), or a combination of hardware and software, which may be collectively referred to herein as "a circuit", "a module", or "a system".

Bluetooth earbuds 800 according to such an implementation of the present disclosure are described below with reference to FIG. 8. The Bluetooth earbuds 800 illustrated in FIG. 8 are merely an example and should not impose any limitations on functions or scope of use of the embodiments of the present disclosure.

Figure 8:
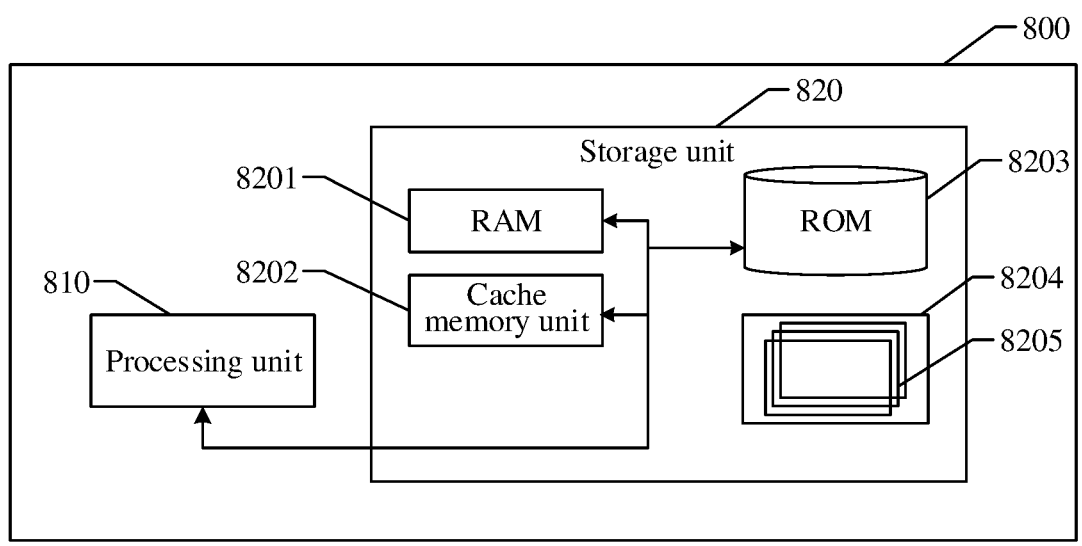
FIG. 8 illustrates a block diagram of Bluetooth earbuds according to embodiments of the present disclosure.

As illustrated in FIG. 8, components of the Bluetooth earbuds 800 may include, but are not limited to, at least one processing unit 810, at least one storage unit 820, and a bus 830 connecting different system components (including the storage unit 820 and the processing unit 810).

Here, the storage unit 820 has program codes stored thereon. The program codes are executable by the processing unit 810 such that the processing unit 810 performs blocks according to various exemplary implementations of the present disclosure as described in the section "Description of embodiments" of this specification. For example, the processing unit 810 may invoke the Bluetooth earbuds 800 to perform, as illustrated in FIG. 3, S102 of transmitting, by a master earbud of the Bluetooth earbuds, connection parameter information of a first wireless link between the master earbud and an audio source device to a slave earbud of the Bluetooth earbuds; S104 of monitoring, by the master earbud, the first wireless link to receive the first audio data transmitted from the audio source device; S106 of detecting, by the master earbud, whether feedback information transmitted from the slave earbud has been received; and S108 of transmitting, by the master earbud in response to correctly receiving the first audio data and failing to receive, within a predetermined time period, any feedback from the slave earbud, an acknowledgement message to the audio source device, to notify the audio source device to transmit second audio data.

Alternatively, the processing unit 810 may further perform, as illustrated in FIG. 4, S202 of receiving, by the slave earbud of the Bluetooth earbuds, the connection parameter information, transmitted from the master earbud of the Bluetooth earbuds, of the first wireless link between the master earbud and the audio source device; S204 of monitoring, by the slave earbud based on the connection parameter information, the first wireless link to receive the first audio data transmitted from the audio source device; and S206 of transmitting, by the slave earbud in response to failing to correctly receive the first audio data, negative feedback information to the master earbud. The negative feedback information is used to indicate that the slave earbud fails to correctly receive the first audio data.

The memory unit 820 may include a readable medium in a form of a volatile memory unit, such as a Random Access Memory (RAM) Unit 8201 and/or a cache memory unit 8202, and may further include a Read-Only Memory (ROM) unit 8203.

The memory unit 820 may further include a program/utility 8204 with a set of program modules 8205 (at least one program module 8205). Such program modules 8205 may include, but not limited to, an operating system, one or more applications, other program modules, and program data, and any one or a combination of these examples may include an implementation of a network environment.

From the above description of the embodiments, those skilled in the art should easily understand that the exemplary embodiments described herein may be implemented by means of software, or by means of software in combination with necessary hardware. Therefore, the technical solutions according to the embodiments of the present disclosure may be embodied in a form of a software product. The software product may be stored on a non-volatile storage medium (which may be a Compact Disc ROM (CD-ROM), a USB flash disk, a removable hard drive, etc.) or on a network, and include a number of instructions to cause a computing device (which may be a personal computer, a server, a terminal device, or a network device, etc.) to implement a method according to any of the embodiments of the present disclosure.

According to exemplary embodiments of the present disclosure, a computer-readable storage medium is further provided. The medium has a program product stored thereon, the program product being capable of implementing the method as described above in the description. In some feasible implementations, the various aspects of the present disclosure may be implemented in a form of a program product including program codes. When the program product runs on a terminal device, the program codes cause the terminal device to implement blocks according to various exemplary implementations of the present disclosure as described in the section "Description of embodiments" of this specification.

Figure 9:
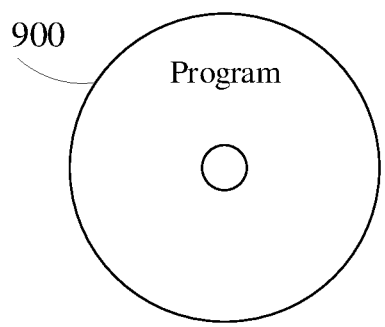
FIG. 9 illustrates a schematic diagram of a computer-readable storage medium according to embodiments of the present disclosure.

FIG. 9 describes a program product 900 for implementing the method according to any of the embodiments of the present disclosure. Referring to FIG. 9, the program product 900 may employ a portable CD-ROM, include program codes, and may run on a terminal device, such as a personal computer. However, the program product of the present disclosure is not limited here. In the present disclosure, a readable storage medium may be any tangible medium that contains or stores a program. The program may be used by or in combination with an instruction execution system, an apparatus, or a device.

The program product may adopt any combination of one or more readable media. The readable medium may be a readable signal medium or a readable storage medium. For example, the readable storage medium may be, but is not limited to, an electrical, magnetic, optical, electromagnetic, infrared, or semiconductor system, apparatus, or device, or any combination thereof. Specific examples (a non-exhaustive list) of the readable storage medium include an electrical connection having one or more wires, a portable diskette, a hard disk, an RAM, a ROM, an Erasable Programmable ROM (EPROM) or a flash memory, an optical fiber, a CD-ROM, an optical memory device, a magnetic memory device, or any suitable combination thereof.

The computer-readable signal medium may include a data signal propagating in a baseband or as part of a carrier, the data signal carrying readable program codes. The data signal propagating in such a manner may be in many forms, including but not limited to, an electromagnetic signal, an optical signal, or any suitable combination thereof. The readable signal medium may be any readable medium other than the readable storage medium, and may transmit, propagate, or transport programs used by or in combination with an instruction execution system, apparatus or device.

The program codes stored on the readable medium may be transmitted using any appropriate medium, including but not limited to a wireless medium, a wireline, an optical fiber cable, Radio Frequency (RF), or any suitable combination thereof.

Program codes for carrying out operations of the present disclosure may be written in one or more programming languages, including an object-oriented programming language, such as Java and C ++, as well as conventional procedural programming language, such as "C" language or similar programming languages. The program codes may be executed entirely on a user's computing device, partly on a user device, as a separate software package, partly on the user's computing device and partly on a remote computing device, or entirely on a remote computing device or a remote server. In a case involving a remote computing device, the remote computing device may be connected to the user's computing device or an external computing device through any kind of network, including a Local Area Network (LAN) or a Wide Area Network (WAN) (e.g., over the Internet by using an Internet service provider).

It is to be noted that although several modules or units of a device for action execution are mentioned in the detailed description above, such a division is not mandatory. In fact, according to the embodiments of the present disclosure, features and functions of two or more modules or units described above may be specified in one module or unit. Conversely, features and functions of the one module or unit described above may be further divided to be specified by a plurality of modules or units.

In addition, although blocks of the method in the present disclosure are described in the accompanying drawings in a particular order, it does not necessarily require or imply that the blocks must be performed in that particular order or that all of the blocks illustrated must be performed to achieve a desired result. In addition or alternatively, certain blocks may be omitted, multiple blocks may be combined into one block for execution, and/or one block may be split into multiple blocks for execution, etc.

Other embodiments of the present disclosure are apparent to those skilled in the art upon consideration of the specification and from practicing of the disclosure disclosed here. The present disclosure is intended to encompass any variations, uses, or adaptations of the present disclosure, which follow the general principles of the present disclosure and include common knowledge or conventional technical means in the art that are not disclosed here. The description and embodiments are to be considered exemplary only, and the real scope and the essence of the present disclosure are defined by the claims as attached.

What is claimed is:

1. A data receiving method for Bluetooth earbuds, comprising:
   transmitting, by a master earbud of the Bluetooth earbuds, connection parameter information of a first wireless link between the master earbud and an audio source device to a slave earbud of the Bluetooth earbuds;
   receiving, by the master earbud through the first wireless link, first audio data from the audio source device;
   obtaining the first audio data by monitoring the first wireless link, by the slave earbud based on the connection parameter information; and
   transmitting an acknowledgement message to the audio source device by the master earbud, in response to not receiving a feedback from the slave earbud in a predetermined time period after receiving the first audio data, so as to notify the audio source device to transmit second audio data.

2. The method according to claim 1, wherein the feedback comprises negative feedback information indicating that the slave earbud fails to receive the first audio data; and the method further comprises:
   transmitting the negative feedback information to the master earbud by the slave earbud, in response to the slave earbud failing to obtain the first audio data.

3. The method according to claim 2, further comprising:
   transmitting a negative acknowledgement message to the audio source device by the master earbud in response to receiving the negative feedback information from the slave earbud in the predetermined time period, to notify the audio source device to retransmit the first audio data.

4. The method according to claim 1, wherein the feedback comprises positive feedback information, and wherein the method further comprises:
   not transmitting the positive feedback information to the master earbud by the slave earbud, in response to the slave earbud obtaining the first audio data, the positive feedback information indicating that the slave earbud has received the first audio data.

5. The method according to claim 1, further comprising:
   not transmitting feedback information to the master earbud by the slave earbud, in response to the slave earbud failing to obtain the first audio data.

6. The method according to claim 1, wherein the feedback comprises positive feedback information indicating that the slave earbud has received the first audio data; and the method further comprises:
   transmitting the positive feedback information to the master earbud by the slave earbud, in response to the slave earbud obtaining the first audio data.

7. The method according to claim 6, further comprising:
   transmitting the acknowledgement message to the audio source device by the master earbud in response to receiving the first audio data and receiving the positive feedback information from the slave earbud, to notify the audio source device to transmit the second audio data.

8. The method according to claim 1, further comprising:
   transmitting a negative acknowledgement message to the audio source device by the master earbud in response to the master earbud failing to receive the first audio data, to notify the audio source device to retransmit the first audio data.

9. The method according to claim 1, further comprising, prior to said transmitting, by the master earbud of the Bluetooth earbuds, the connection parameter information of the first wireless link between the master earbud and the audio source device to the slave earbud of the Bluetooth earbuds:
   establishing a first wireless connection between the master earbud and the audio source device to form the first wireless link; and
   establishing a second wireless connection between the master earbud and the slave earbud to form a second wireless link.

10. The method according to claim 9, wherein said transmitting, by the master earbud of the Bluetooth earbuds, the connection parameter information of the first wireless link between the master earbud and the audio source device to the slave earbud of the Bluetooth earbuds comprises:
    transmitting, by the master earbud through the second wireless link, the connection parameter information of the first wireless link to the slave earbud.

11. The method according to claim 9, further comprising:
    detecting, by the master earbud, whether feedback transmitted from the slave earbud has been received through the second wireless link.

12. The method according to claim 9, wherein the predetermined time period is shorter than or equal to a time length of a receiving time slot of the second wireless link.

13. Bluetooth earbuds, comprising:
    one or more processors; and
    memory configured to store instructions which, when executed by the one or more processors, cause the one or more processors to:
    transmit, by a master earbud of the Bluetooth earbuds, connection parameter information of a first wireless link between the master earbud and an audio source device to a slave earbud of the Bluetooth earbuds;
    receive, by the master earbud through the first wireless link, first audio data transmitted from the audio source device;
    monitor, by the slave earbud based on the connection parameter information, the first wireless link to obtain the first audio data; and
    transmit an acknowledgement message to the audio source device by the master earbud, in response to not receiving a feedback from the slave earbud in a predetermined time period after receiving the first audio data, so as to notify the audio source device to transmit second audio data.

14. The Bluetooth earbuds according to claim 13, wherein the feedback comprises negative feedback information indicating that the slave earbud fails to receive the first audio data, the instructions further cause the one or more processors to:
    transmit the negative feedback information to the master earbud by the slave earbud, in response to the slave earbud failing to obtain the first audio data.

15. The Bluetooth earbuds according to claim 14, the instructions further cause the one or more processors to:

transmit a negative acknowledgement message to the audio source device by the master earbud, in response to the master earbud receiving the negative feedback information from the slave earbud in the predetermined time period, so as to notify the audio source device to retransmit the first audio data.

16. The Bluetooth earbuds according to claim 13, wherein the feedback comprises positive feedback information, and the instructions further cause the one or more processors to:
not transmit the positive feedback information to the master earbud by the slave earbud, in response to the slave earbud obtaining the first audio data, the positive feedback information indicating that the slave earbud has received the first audio data.

17. The Bluetooth earbuds according to claim 13, the instructions further cause the one or more processors to:
not transmit feedback information to the master earbud by the slave earbud, in response to the slave earbud failing to obtain the first audio data.

18. The Bluetooth earbuds according to claim 13, wherein the feedback comprises positive feedback information indicating that the slave earbud has received the first audio data; and the instructions further cause the one or more processors to:
transmit the positive feedback information to the master earbud by the slave earbud, in response to the slave earbud obtaining the first audio data.

19. The Bluetooth earbuds according to claim 13, the instructions further cause the one or more processors to:
transmit a negative acknowledgement message to the audio source device by the master earbud in response to the master earbud failing to receive the first audio data, so as to notify the audio source device to retransmit the first audio data.

20. A non-transitory computer-readable storage medium, having a computer program stored thereon, wherein the computer program, when executed by a processor, implements:
transmitting, by a master earbud of the Bluetooth earbuds, connection parameter information of a first wireless link between the master earbud and an audio source device to a slave earbud of the Bluetooth earbuds;
receiving, by the master earbud through the first wireless link, first audio data transmitted from the audio source device;
obtaining the first audio data by monitoring the first wireless link, by the slave earbud based on the connection parameter information; and
transmitting an acknowledgement message to the audio source device by the master earbud, in response to not receiving a feedback from the slave earbud in a predetermined time period after receiving the first audio data, so as to notify the audio source device to transmit second audio data.

* * * * *